United States Patent
Zhang et al.

(10) Patent No.: US 9,668,235 B2
(45) Date of Patent: May 30, 2017

(54) PAGING CONTROL

(75) Inventors: Yi Zhang, Beijing (CN); Lei Du, Beijing (CN); De Shan Miao, Beijing (CN); Johanna Katariina Pekonen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 116 days.

(21) Appl. No.: 13/985,433

(22) PCT Filed: Feb. 14, 2011

(86) PCT No.: PCT/CN2011/000228
§ 371 (c)(1),
(2), (4) Date: Sep. 20, 2013

(87) PCT Pub. No.: WO2012/109765
PCT Pub. Date: Aug. 23, 2012

(65) Prior Publication Data
US 2014/0038647 A1    Feb. 6, 2014

(51) Int. Cl.
*H04W 68/00* (2009.01)
*H04W 68/02* (2009.01)

(52) U.S. Cl.
CPC ......... *H04W 68/02* (2013.01); *H04W 68/005* (2013.01)

(58) Field of Classification Search
CPC ..... H04W 4/005; H04W 68/00; H04W 68/02; H04W 48/12; H04W 64/00; H04W 92/18;
(Continued)

(56) References Cited

U.S. PATENT DOCUMENTS

2007/0105600 A1* 5/2007 Mohanty et al. ............. 455/574
2009/0061851 A1* 3/2009 Kitazoe ..................... 455/426.1
(Continued)

FOREIGN PATENT DOCUMENTS

CN    101389066 A    3/2009
CN    101755475 A    6/2010
(Continued)

OTHER PUBLICATIONS

3GPP TS 22.368 V11.0.0 (Dec. 2010), "3$^{rd}$ Generation Partnership Project; Technical Specification Group Services and System Aspects; Service requirements for Machine-Type communications (MTC); Stage 1 (Release 11)", 23 pgs.
(Continued)

*Primary Examiner* — Nimesh Patel
(74) *Attorney, Agent, or Firm* — Harrington & Smith

(57) ABSTRACT

A method and an apparatus for controlling paging for a plurality of devices capable of wireless communication are disclosed in the invention. The method includes the following steps: paging locations in frames are determined for at least one device of the plurality of devices and a paging type indication indicative of a group paging or a dedicated paging is communicated to the at least one device to control calculation of paging locations according to the group paging mode or the dedicated paging mode in a predetermined manner. The device receives the paging type indication and in response thereto calculates the paging locations in received frames according to the group paging mode or the dedicated paging mode.

22 Claims, 3 Drawing Sheets

(58) Field of Classification Search
CPC ... H04W 4/02; H04W 68/025; H04W 84/027; H04W 8/186; H04W 36/32; H04W 4/028; H04W 8/005; H04W 8/08; H04W 4/206; H04W 52/0209; H04W 4/08; H04W 48/16; H04W 4/06; H04W 60/04; H04W 52/0216; H04W 68/005; H04W 36/0022; H04W 36/0083
USPC ................................. 455/458, 426.1, 515
See application file for complete search history.

(56) References Cited

U.S. PATENT DOCUMENTS

| | | | |
|---|---|---|---|
| 2009/0061916 A1* | 3/2009 | Kim et al. | 455/466 |
| 2009/0296615 A1* | 12/2009 | Kim et al. | 370/311 |
| 2010/0035633 A1* | 2/2010 | Park et al. | 455/456.1 |

FOREIGN PATENT DOCUMENTS

| | | |
|---|---|---|
| CN | 101796874 A | 8/2010 |
| CN | 101883331 A | 11/2010 |
| WO | WO 2009/082076 A1 | 7/2009 |

OTHER PUBLICATIONS

3GPP TS 36.331 V9.5.0 (Dec. 2010) "3$^{rd}$ Generation Partnership Project; Technical Specification Group Radio Access Network; Evolved Universal Terrestrial Radio Access (E-UTRA); Radio Resource Control (RRC); Protocol specification (Release 9)", 252 pgs.

* cited by examiner

PAGING CONTROL

This disclosure relates to paging in wireless systems, and more particularly to providing control on operation of paged devices.

A wireless system can be seen as a facility that enables communications between two or more wireless entities such as fixed or mobile communication devices, base stations, servers and/or other devices capable of wireless communication. The system and compatible wireless devices typically operate in accordance with a given standard or specification which sets out what the various entities associated with the system are permitted to do and how that should be achieved. A wireless communication device is provided with an appropriate signal receiving and transmitting arrangement for enabling communication of voice, data and signalling with other parties. A wireless communication device is often referred to as user equipment (UE) or terminal.

Examples of wireless systems include public land mobile networks (PLMN) such as cellular networks, satellite based communication systems and different wireless local networks. Examples of wireless local area networks (WLAN) include systems known by the names Wi-Fi and Wi-Max. Examples of PLMN systems include architectures standardized by the 3rd Generation Partnership Project (3GPP). These include the Universal Mobile Telecommunications System (UMTS) and the long-term evolution (LTE) of the Universal Mobile Telecommunications System (UMTS). A further development of the LTE is often referred to as LTE-Advanced. A wireless radio connection between devices can also be provided by short range radio, for example based on the Bluetooth™ radio.

A feature of the wireless system is paging for wireless devices. An example of paging procedures is specified in a $3^{rd}$ Generation Partnership Project Technical Specification 3GPP TS 36.331, version 9.5.0 of December 2010 titled 'Evolved Universal Terrestrial Radio Access (E-UTRA); Radio Resource Control (RRC)'. In accordance with this 3GPP protocol specification a base station site, referred to as an enhanced Node B (eNB), advertises paging parameters including paging cycle and information for use in calculation of paging occasions, more particularly an nB parameter, and so on via system information (SI) signalling. After a communication device acquires the information, it can calculate corresponding paging frame (PF) and paging occasion (PO), or a relevant subframe, based on its user equipment identity (UE ID) and the received parameters according to a predefined rule. Those subframe locations can then be monitored periodically. When a paging message originates from the core network, the eNB can calculate the paging frame and paging occasion in the same way and deliver the paging message in these slots so that the communication device can detect the message.

The concept of group paging has also been proposed. In group paging a group identity can be added to paging messages and the recipient communication device can then calculate the paging occasion based on the group identity. If group paging is applied, there are thus at least two identities which can be referred to for paging a device. That is, a device can be paged based on a legacy user equipment identity, e.g. an IMSI (International Mobile Subscriber Identity) or a TMSI (Temporary Mobile Subscriber Identity), and a group identity. When the paging is addressed to be dedicated to a particular device, the legacy user equipment identity can be used according to a normal paging procedure. If paging is addressed to all members in a group, a group identity can be used instead of aggregation of a large number of user equipment identities, thus saving in signalling over the air interface. Since both of these scenarios are possible, a communication device needs to use both of these two identities to compute the relative paging frame and paging occasion in which paging messages are transferred. Once the locations are resolved, the devices can then listen to the paging messages in these paging frames/occasions for individual and group paging purposes to ensure correct paging reception. The current proposals require that a communication device always calculate the paging occasions by means of its own identity and the group identity.

The group paging concept can cause complexity and increase battery consumption of a wireless device. For example, a wireless device that is only occasionally used may need to wake up in paging occasions for group paging purpose in addition to those for dedicated paging purposes. Considering that there can be a large number of devices in a network and/or in a group, the battery/power consumption by individual devices may become an issue that needs to be addressed. Furthermore, in case a device belongs to a multiple of groups, the device has to compute all of the possible paging frames/paging occasions in order not to miss pages by the network. This can result even higher battery consumption. This may be in particular a case in networks consisting of machine type communication devices.

It is noted that the above discusses only examples, and the issues are not limited to any particular communication system, standard, specification, radios and so forth, but may occur in any communication device and/or system where in-device interference may be caused by multiple of radios. Embodiments of the invention aim to address one or several of the above issues.

In accordance with an embodiment there is provided a method of controlling paging for a plurality of devices capable of wireless communication, the method comprising receiving at a device of the plurality of devices a paging type indication indicative of a group paging or a dedicated paging, and in response to the paging type indication, causing calculation of paging locations in received frames according to a group paging mode or a dedicated paging mode in a predetermined manner.

In accordance with another embodiment there is provided a method of controlling paging for a plurality of devices capable of wireless communication, the method comprising determining paging locations in frames that at least one device of the plurality of devices shall monitor, and sending to said at one device a paging type indication indicative of a group paging or a dedicated paging to control calculation of paging locations to be according to a group paging mode or a dedicated paging mode in a predetermined manner.

In accordance with an embodiment there is provided an apparatus for controlling paging in a communication system comprising a plurality of devices capable of wireless communication, the apparatus comprising at least one processor, and at least one memory including computer program code, wherein the at least one memory and the computer program code are configured, with the at least one processor, to determine if group paging or dedicated paging is to be used based on a paging type indication received at a device of the plurality of devices, and in response to the determination, calculate paging locations in transmission frames according to a group paging mode or a dedicated paging mode in a predetermined manner.

In accordance with a yet further embodiment there is provided an apparatus for controlling paging in a communication system comprising a plurality of devices capable of wireless communication, the apparatus comprising at least one processor, and at least one memory including computer program code, wherein the at least one memory and the computer program code are configured, with the at least one processor, to determine paging locations in frames that at least one device of the plurality of devices shall monitor, and control calculation of paging locations by the at least one device to be according to a group paging mode or a dedicated paging mode in a predetermined manner by causing sending of a paging type indication indicative of a group paging or a dedicated paging to said at least one device.

In accordance with a more detailed embodiment a group paging mode may be enabled or disabled. The change may be provided on a per message basis.

Calculations in the dedicated paging mode may comprise calculation of paging occasions in frames based on an identity of the device. Calculations in the group paging mode may comprise calculation of paging occasions in frames based on an identity of at least one group of devices. Calculations in the group paging mode may also comprise calculation of paging occasions in frames based on an identity of the device and an identity of at least one group.

The paging type indication may comprise a flag indicative of support for group paging. The flag may comprise a one bit flag, wherein a predetermined value of the one bit flag indicates support for group paging and causes calculation of paging occasions based on a device identity and at least one group identity and the other value of the one bit flag causes calculation of paging occasions based on the device identity.

Alternatively, the flag may comprise a two bit flag, wherein a first predetermined value of the two bit flag causes calculation of paging occasions based on device identity; a second predetermined value of the two bit flag causes calculation of paging occasions based on at least one group identity, and a third predetermined value of the two bit flag causes calculation of paging occasions based on a device identity and at least one group identity.

An indication of group paging may be communicated from a network entity to a station serving the plurality of stations, and in response thereto, switched to a group paging mode mat take place. A station serving the plurality of devices may be configured to a group paging mode by means of operations, administration and maintenance apparatus.

A group type indication may comprise an identity of at least one group. A further indication indicative if the locations are calculated based only on one or more identities of groups, based only on identity of the recipient device or based on identities of the one or more groups and the recipient device may also be communicated. Information of the identity of the at least one group may be communicated in a message of a first type and an indication of the mode of operation for the location calculations in a message of a second type.

A station serving the plurality of devices may advertise information associated with the paging type to other stations.

The devices may comprise devices configured to communicate via machine type connections or user equipment.

A device and/or base station apparatus comprising a control apparatus configured to provide at least one of the embodiments can also be provided. The device may comprise a user equipment.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which.

In the following certain exemplifying embodiments are explained with reference to a wireless communication system serving devices adapted for wireless communication with at least one other node. Therefore, before explaining in detail the exemplifying embodiments, certain general principles of a wireless system, components thereof, and devices for wireless communication are briefly explained with reference to system 10 of FIG. 1 and control apparatus 20 of FIG. 2 to assist in understanding the technology underlying the described examples.

A wireless communication device 1 and 2 can be provided wireless access to a communication system via at least one base station or similar wireless node. An access system may be provided by a cell of a public landline mobile network (PLMN) system or another system, for example a WLAN, enabling a wireless device to access a communication system. A communication device 1 may further communicate with for example another device, for example with device 2. This communication may be provided, for example, by means of Bluetooth™ connectivity. Each wireless device 1 and 2 may receive and/or transmit signals via appropriate apparatus for receiving and/or transmitting signals. The transceiver may be provided for example by means of a radio part and associated antenna arrangement. The antenna arrangement may be arranged internally or externally to the device. A wireless communication device can be provided with a Multiple Input/Multiple Output (MIMO) antenna system.

Figure 1:
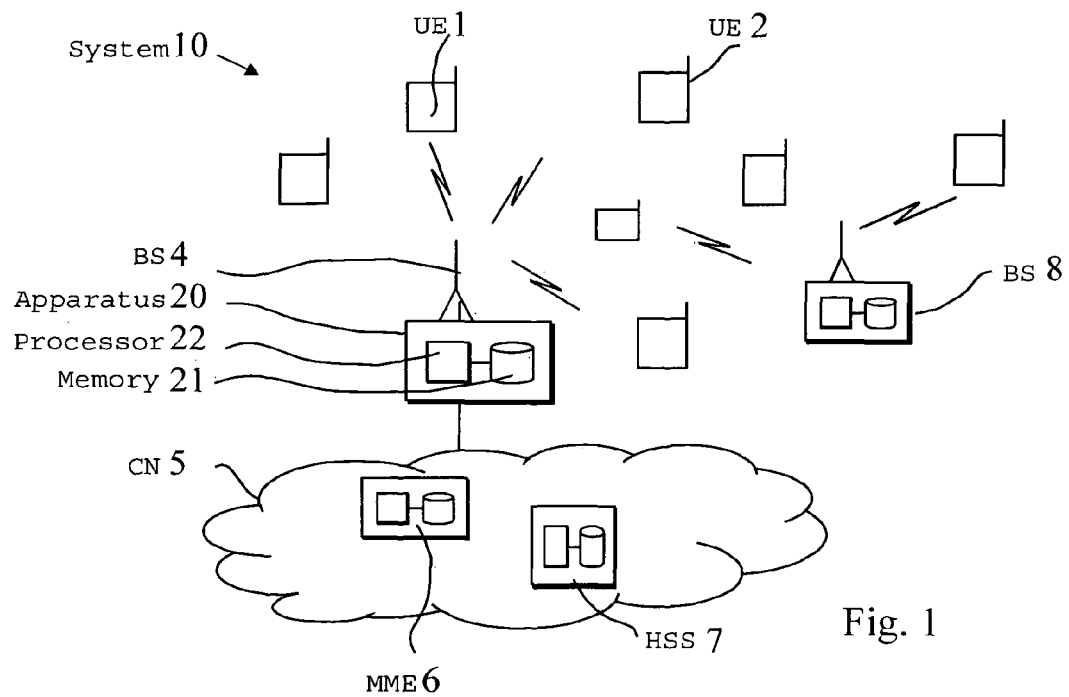
FIG. 1 shows an example of a system wherein below described examples of the invention may be implemented.

In FIG. 1 a base station site 4 provides a radio service area of a cellular system. It is noted that a great number of cellular radio service areas may be provided in a communication system and that a communication device may simultaneously be located in a plurality of cellular service areas.

This is illustrated by the second base station site 8. The second base station may belong to the same PLMN as base station 4 or to a different PLMN. Also, the base stations may be operated by the same or different operators. Also, a base station can provide more than one cell and/or a plurality of sectors, for example three radio sectors, each sector providing a cell or a sub radio service area of a cell.

A base station is typically controlled by at least one appropriate controller so as to enable operation thereof and management of mobile communication devices 1 and 2 in communication with the base station. The control apparatus can be interconnected with other control entities. In FIG. 1 a controller apparatus is shown to be provided by block 20. A base station control apparatus is typically provided with memory capacity 21 and at least one data processor 22. The control apparatus and functions may be distributed between a plurality of control units.

A non-limiting example of communication systems is the longterm evolution (LTE) of the Universal Mobile Telecommunications System (UMTS) that is being standardized by the 3rd Generation Partnership Project (3GPP). A LTE base station is known as NodeB (NB) in the vocabulary of the 3GPP specifications. LTE based systems can employ a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the wireless devices.

In FIG. 1 example base station 4 is connected to a core network (CN) 5. The core network can be understood as providing an operator domain. One or more control entities may be provided in the core network for facilitating operation of access systems and access by the communication devices. FIG. 1 shows a mobile management entity (MME) 6 and a home subscriber server (HSS) 7. A gateway function may also be provided to connect to another network via the network 5. The other network may be any appropriate network. A wider communication system may thus be provided by one or more interconnect networks and the elements thereof, and one or more gateways may be provided for interconnecting various networks.

Figure 2:
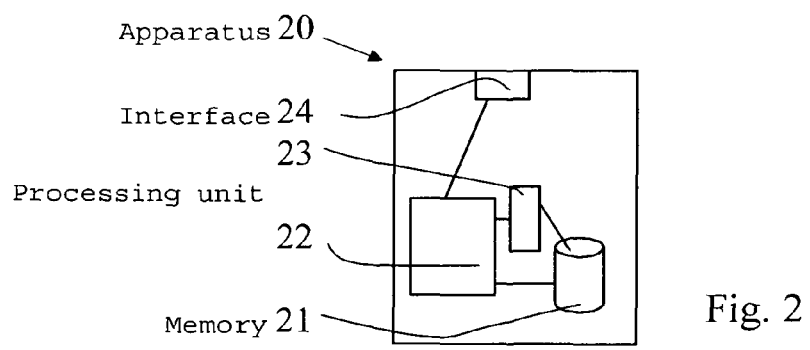
FIG. 2 shows an example of a controller apparatus.

FIG. 2 shows an example of a control apparatus 20 for a node of a communication system, for example to be coupled to and/or for controlling a station of a radio service area, for example one of the base stations 4 or 8 or the devices 1 or 2 of FIG. 1. The control apparatus 20 can be arranged to provide control on paging operation of communication devices that are in the service area of the base station 4. A control apparatus in accordance with FIG. 2 can be configured to provide control functions in association with generation, communication and interpretation of information regarding paging operations. The control apparatus can control use of different modes of paging operations and/or switching between the modes and other related information and for coordination of communications in accordance with certain embodiments described below. For providing the control the control apparatus 20 comprises at least one memory 21, at least one data processing unit 22, 23 and an input/output interface 24. Via the interface the control apparatus can be coupled to the relevant node. The control apparatus 20 can be configured to execute an appropriate software code to provide the control functions.

Figure 3:
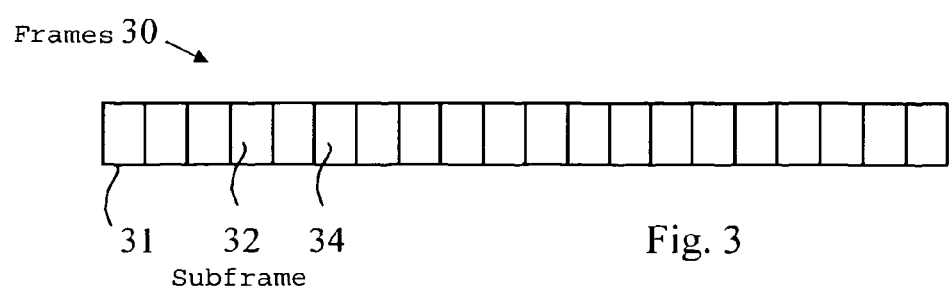
FIG. 3 shows an example of transmission frames.

FIG. 3 is a schematic example of two frames 30 for communication from a base station to communications devices. For example, in LTE each frame consists of 20 slots, or 10 subframes 31. A paging occasion is a subframe where a paging radio network temporary identifier (P-RNTI) can be transmitted addressing a paging message. To give an illustrative non-limiting example, subframe 32 may carry a dedicated page for device 1 in FIG. 1 whereas subframe 34 may carry a group page for a plurality of devices within the range of a base station. It is noted that not all devices within the range of a base station are necessarily listening to a given group page, and thus this may apply only to devices that a members of a group identified by a group identifier. In the following certain specific embodiments are discussed in more detail how to control the operation of the devices in relation to these different pages.

Figure 4:
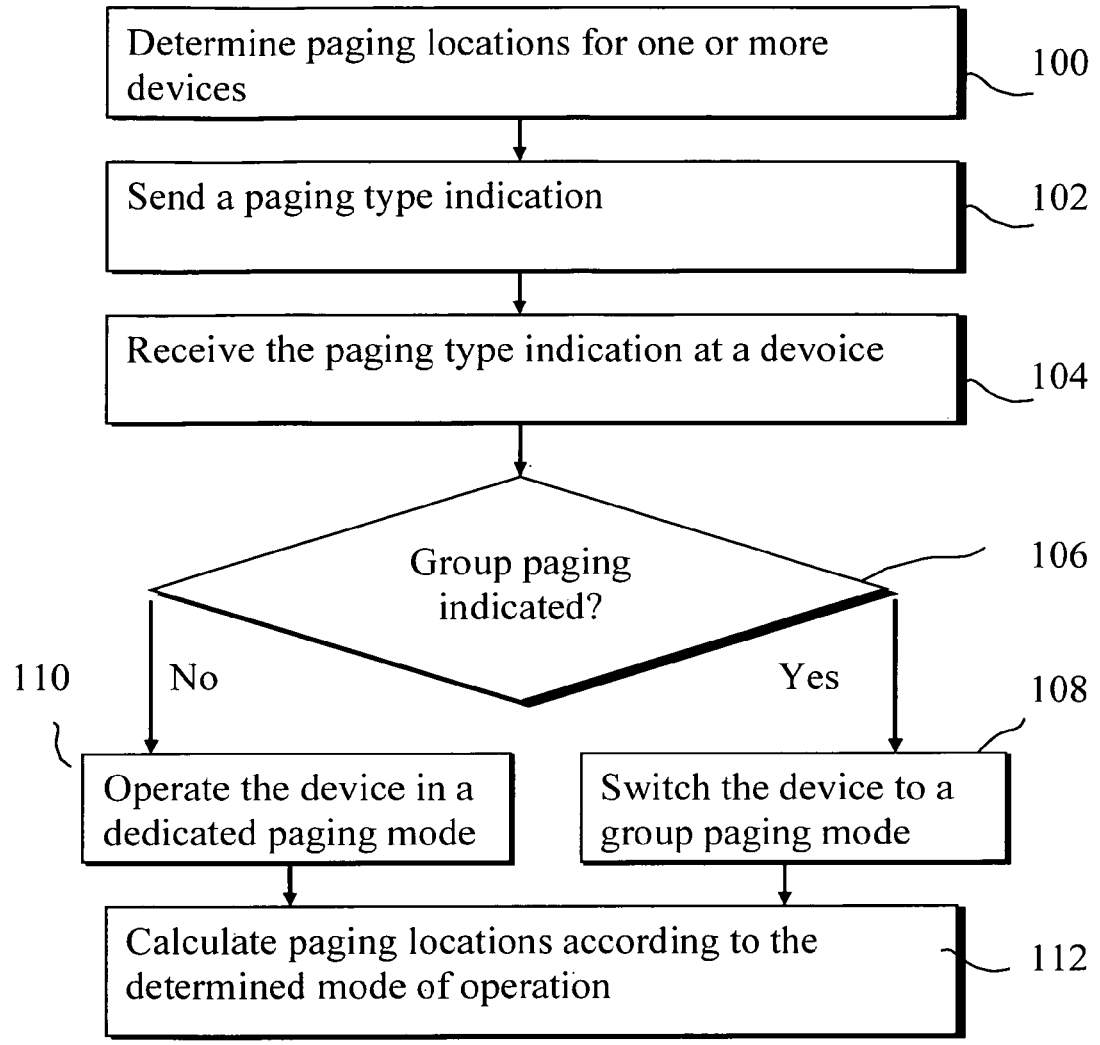
FIGS. 4 and 5 are flowcharts in accordance with certain embodiments.

FIG. 4 is a flowchart in accordance with an embodiment. In this embodiment a controller apparatus of a base station determines at 100 the paging locations in transmission frames that at least one device of a plurality of devices shall monitor. The determination may be based on information or direct instructions from another entity, for example a core network controller. The controller apparatus then causes sending of a paging type indication indicative of at least one of a group paging and a dedicated paging at 102 to control calculations of the paging locations in a predetermined manner. By means of the indication the base station can apply control on the calculations by the devices to be according to a desired mode that is according to group paging and/or dedicated paging. A device receives at 104 the paging type indication. The device can then determine at 106 the mode to be used and more particularly if the calculation shall be according to a group paging mode or if a dedicated paging mode is to be used. In the group paging mode the calculations may be based on an identity of the device and an identity of at least one group. According to a possibility the calculations in the group paging mode are based on an identity of at least one group of devices. The controller of the device then causes appropriate switching to the determined mode at 108 or 110. Calculations of paging locations in transmission frames at 112 will then be provided in the predetermined manner according to the mode selected in response to the paging type indication.

In accordance with a more detailed example, a base station, such as an eNB, broadcasts a one bit flag to indicate whether group paging is supported or not. If the value of the 1-bit flag equals 1 (or 0 if this is determined to be other way around), the device can determine that group paging is supported by the base station. The device can then calculate paging occasions based on both its identity and all group identities assigned to it. Otherwise, the device shall only calculate paging occasions based on its own identity to save power.

The one bit can be added into a system information message broadcast by the base station to indicate if the base station is to page the devices with their group identities. This embodiment may be particularly advantageous if there is only one common group, for example one specific machine type connection (MTC) group in a network.

The base station can be configured to indicate whether group paging feature is switched ON or OFF. Operation, administration and maintenance (OAM) arrangement can be used to configure this feature at a base station. According to a possibility a mobility management entity (MME) 7 of FIG. 1 indicates a 1-bit flag to one or more base station in an appropriate control message if the devices shall be paged in a group. For example, a S1 application protocol message can be sent between the MME 7 and the base station 4, the S1 application protocol being for radio network control plane signalling over S1 interface.

The MME can also indicate whether the paging message is for a group of devices or not for each paging message.

After receiving an indication of the paging type from the MME, the base station can send a 1-bit flag to the respective device or devices accordingly via its system information (SI) broadcast so as to control the behaviour of the device(s). The control can be advantageously applied in order to save power.

In accordance with a possibility more than one bit is used for the indication. For example, the 1-bit flag can be extended to a two bit flag to indicate three modes for the operation of the device. The three modes can comprise a dedicated mode where monitoring of paging occasions is calculated based only on the device's own identity, a first group mode where monitoring for paging occasions is calculated based on the device's group IDs only, and a second group mode where monitoring for paging occasions is calculated based on both on the devices' own identity and the group IDs.

If the base station belongs to different public landline mobile network (PLMN), as shown in the example of FIG. 1, and the configurations/settings for the PLMNs are different, the base station may advertise the flag for the PLMNs in its PLMN list respectively. The paging configuration can be received from operations, administration, and maintenance (OAM) apparatus or a core network (CN) and the base station can simply broadcast the configuration with its PLMN list. If group paging is supported and a different PLMN has different group paging configuration, a base station can broadcast the related paging configuration information along with the PLMN list.

Grouping of devices may be applied for different purposes and may impact different network nodes. Some groups may need to be awarded by both a radio access network (RAN) and a core network (CN). This may be the case with devices that are grouped in a large number so as to save the signalling overhead and to avoid congestion. A group ID can be downloaded as a part of a service profile from the HSS into a signalling general packet radio service (GPRS) support node/mobile management entity (SGSN/MME). In some other cases the grouping only impacts the core network, and there may be no need for retrieval of grouping information by a SGSN/MME. Therefore, a MME may not know all the group IDs within the relevant PLMN. Instead, a MME may be arranged to retrieve a group ID from a home subscriber server (HSS) only when needed. A consequence of this can be that if a base station is allowed to set the 1-bit flag to indicate group paging, for example "1", it is possible that the mobility management entity (MME) does not apply group paging for all the devices allocated to the groups. For example, when one device belongs to a multiple of groups, it is possible that the group paging is only applied to one or several groups but not all of them. In such scenario, a device can be made aware of those group identities in association of which it will be paged via group paging. Based on this information the device can monitor the paging occasions calculated based on these specific group IDs, either solely or together with the device IDs. There are various possibilities to achieve this.

Figure 5:
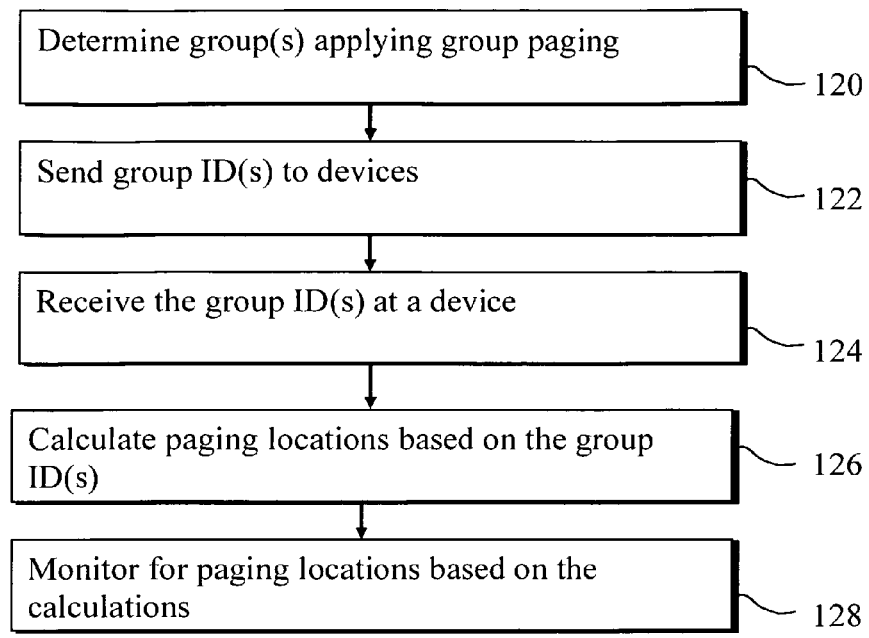

In accordance with a possibility illustrated by the flowchart of FIG. 5 it is determined at 120 that at least one group is defined. A control entity, for example a MME, can then indicate the identities of those groups that apply group paging to devices via non access stratum (NAS) signalling. Appropriate messages may be sent at 122 to a device, for example when the device performs an attach procedure or a tracking area update procedure. The group identities serve as indications of use of group paging, and thus reception of at least one group identity at 124 indicates for the device that group paging is in use. The device can then calculate at 126 locations based on the indicated group identities, and monitor for the calculated locations at 128.

Besides sending of the group identities at 122, a one bit flag can also be added into a non access stratum (NAS) message to indicate whether both group paging and dedicated paging are supported, or if only group paging is supported.

A mobility management entity (MME) can extract at 120 a mapping table-between the groups and devices from a home subscriber server (HSS). The table contain information of groups and devices included in the groups. With the mapping table, the MME can determine whether it has group IDs for the devices and on which group IDs it will apply group paging. The MME may also determine if it shall send indication of the availability of group paging only or if both group and dedicated paging are possible.

After the device receives the NAS message regarding the groups, it can monitor paging occasions calculated for those group IDs available in the NAS message. The calculation can be done solely based on the group ID(s) or in addition to paging occasions calculated based on the identity of the device.

A one bit flag can be communicated by system information (SI) and another one bit flag can be communicated by non access stratum (NAS) signalling. The one bit flag in a NAS message can be used to further denote additional information, together with the 1-bit flag used in system information, for each group ID. According to a possibility a 1-bit flag in system information can be used only to indicate whether the group paging is supported or not. For example, when this bit indicates 'ON' and if the device belongs to multiple groups, the device shall listen to multiple paging occasions for these groups in one discontinuous reception (DRX) cycle in addition to it's own dedicated paging occasions. In some scenarios only a part of the groups may need group paging, and thus the network may transfer these group IDs to devices by means of the NAS signalling. After receiving these IDs, the device only needs to listen to the group paging occasions corresponding to those IDs. According to a possibility a 1-bit flag can be sent in NAS along with each group ID. In some applications this bit can be used further to control the behaviour of the receiving device to only listen to paging occasions for group paging. The configuration can be such that if this 1-bit flag in NAS is not communicated, the device has to listen paging occasions for both group paging and dedicated paging. According to an example, if the value of the 1-bit flag of a NAS message equals one, the device can determine that only group paging is supported. That is, the device will only calculate paging occasions based on the related group IDs. Otherwise, the device calculates paging occasions based on its own user equipment identity and the group ID.

Instead of a 1-bit flag in a NAS message, this indication can be extended to two bits to indicate at least three different modes of operation. In a mode the device can, despite receiving a group identity, be instructed to monitor paging occasions based on its own identity only. In a second mode monitoring paging occasions based on one or more group IDs only can be instructed. In a third mode monitoring of paging occasions calculated based on both the device identity and the group IDs can be instructed. Thus the 1-bit flag in system information as of the above example can be saved.

According to a possibility a base station sends the group IDs it applies via system information instead of the NAS signalling. For example, the sending may take place upon an eNB being configured by operations, administration, and maintenance (OAM) apparatus or receiving appropriate information, for example a paging message, from one or more mobility management entities (MME). When the device detects one or more group IDs that are associated with itself, it can monitor the paging occasions calculated based on those group IDs together with the paging occasion calculated based on its own ID. Otherwise, the device shall only calculate paging occasions that are based on its own identity. This can be advantageously used to save power.

If group IDs are present in the system information, a 1-bit flag as described above can be used to indicate whether the device shall monitor both group and dedicated paging, or only monitor for group paging.

If a base station belongs to a PLMN in an area where there are different PLMNs and different configurations/settings for the PLMNs, the eNB can advertise the group IDs for the PLMNs in its PLMN list respectively.

Figure 6:
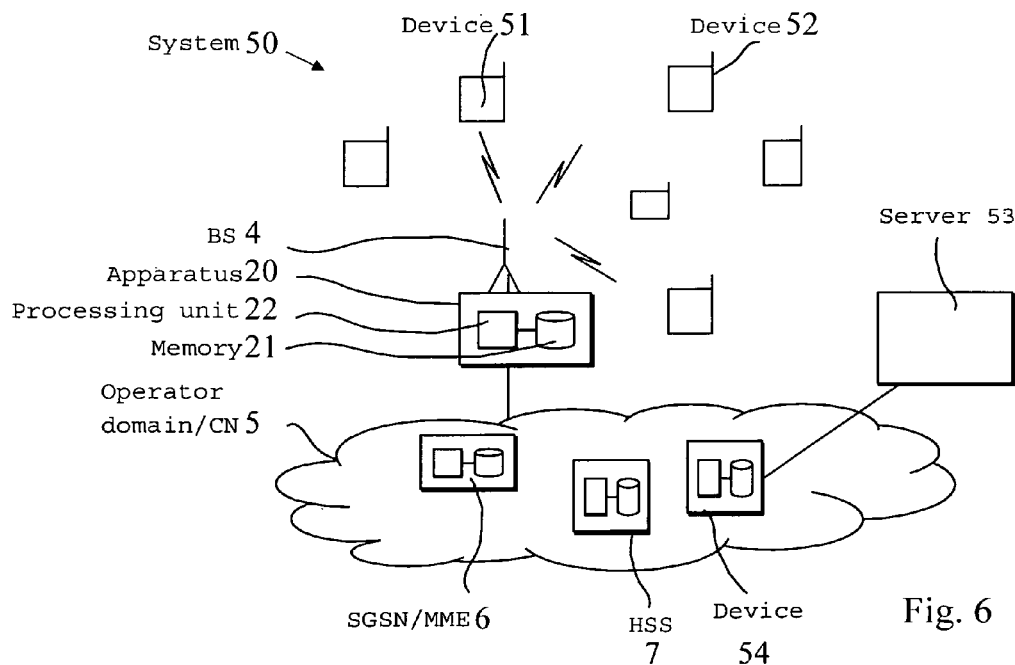
FIG. 6 shows an example of another system where the invention can be used.

A possible specific use scenario is shown in FIG. 6. This example relates to a machine type communication (MTC) systems 50. Machine type communication is a form of data communication which involves one or more devices or entities that do not necessarily need human interaction. A MTC device 51, 52 can be seen as a user equipment that is equipped for machine type communication. A MTC device can be arranged to communicate through a PLMN operator domain 5. The communication is typically with at least one MTC server 53, but can also be with other MTC device(s). A MTC server can be located in the operator domain, or outside an operator domain. A MTC device can also communicate locally or via the operator domain with other entities. The other entities may provide the MTC device with data for processing and communication to the MTC server(s) and/or other MTC device(s). FIG. 6 shows also a MTC user device 54.

Non-limiting examples of MTC devices include various meters, for example remotely readable utility meters and various other industrial and domestic meters and sensors, speed detection devices, control devices, and so forth. An example of definitions for machine type communications (MTC) can be found from 3GPP Technical Specification 22.386 version 11.0.0 of December 2010 titled 'Service requirements for Machine-Type Communications'.

The envisioned system improvements for MTC include group based optimization. A MTC group can be defined as a group of MTC devices that share one or more group based features and that belong to the same MTC Subscriber. MTC devices can be grouped together for the control, management and/or charging facilities an so forth to meet various needs. The optimization may provide easier mode to control, update and/or charge MTC devices. Grouping of MTC devices can be used to decrease redundant signalling to avoid congestion. Also, network resources may be saved by using group based optimization when the number of MTC devices is large. MTC devices 51, 52 within a group can be in an area and/or may have the same MTC features attributed and/or belong to the same MTC user 54. Each of the MTC devices can be visible from the network perspective. Since the grouping of MTC devices can depend on the MTC features, it is possible to associate a device with one or several groups. The groups can be defined based on agreement between MTC user and the operator, for example at the time of subscription. Each MTC group can be identified by a group ID which is unique within the PLMN. One MTC device can be associated with one or several group IDs besides its own identity, which are stored as part of the profile of the device in home subscriber server (HSS) 7. A group identity can be of any shape similar or different from the identities of the individual devices.

Depending on the MTC features associated with the particular group, the MTC group can be applied for different purposes and may impact different network nodes. Some groups may need to be awarded by both a radio access network (RAN) and the core network (CN). This may be the case e.g. with smart meters which are grouped in a large number so as to save the signalling overhead and to avoid congestion. In this case, the MTC group ID can be downloaded as a part of a service profile from the HSS 7 into a SGSN/MME 6. In some other cases such grouping only impacts the CN 5, e.g. health monitoring devices which facilitate charging but where there is no need for retrieval by a SGSN/MME. Therefore, MME may not know all the group IDs within the PLMN. Instead, it may retrieve the group ID only when needed.

MTC devices can be configured, paged, controlled during radio resource control (RRC) connection procedure in group unit, to reduce the signalling overhead. The above described embodiments can be used to page the MTC devices in the group unit.

A group of MTC devices can be allocated based on the application. For example, meters can be grouped for overhead reduction while other devices, for example health monitoring devices, can be grouped for charging purposes only without any intention to be paged through group paging. Therefore it is possible for the MME that it cannot recognize all group IDs. In such instance the behaviour of the MTC device may increase the battery consumption. The behaviour of the MTC device can be controlled as explained above so that it knows when to calculate the paging occasions based on its own ID, when to calculate the paging occasions based on the group ID and/or when to calculate the paging occasion based on both its own and the group ID or group IDs.

It is noted that in addition to the MTC systems, the proposed method can be also used in other systems, for example any of the systems based on the UMTS.

The required data processing apparatus and functions of a base station apparatus, a device in a group and any other appropriate node or element may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

An appropriately adapted computer program code product or products may be used for implementing the embodiments, when loaded or otherwise provided on an appropriate data processing apparatus, for example for causing determinations of the groups, use of appropriate modes and configurations and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to communications system such as those based on 3GPP and with relation to MTC, similar principles can be applied to other communication systems where multiple types of paging may occur. For example, this may be the case in application where no fixed station equipment is provided but a communication system is provided by means of a plurality of user equipment, for example in adhoc networks. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method comprising:
controlling paging for a plurality of devices capable of wireless communication in a radio service area of a network node, wherein the network node comprises a base station, and wherein the plurality of devices comprises a plurality of user equipment;
receiving at a device of the plurality of devices a paging type indication that indicates that one of a group paging or dedicated paging is used in the radio service area of the network node, wherein the paging type indication is received prior to receiving a paging message from the radio service are;
in response to the received paging type indication, controlling by the device, in a predetermined manner, calculation of paging locations for the paging message in received frames from the network node according to one of a group paging mode if the paging type indication indicates group paging is used in the radio service area of the network node and a dedicated paging mode if the paging type indication indicates dedicated paging is used in the radio service area of the network node; and
based on the controlling, receiving, by the device, in the radio service area the paging message in at least one of subsequent paging frames and paging occasions in the calculated paging locations as a result of periodic monitoring according to the one of group paging or dedicated paging indicated in the received paging type indication.

2. A computer program product comprising a non-transitory computer readable storage medium embodying computer program code executed by at least one processor to perform the method of claim 1 when the computer program code is run on a data processing apparatus.

3. A method comprising:
controlling paging for a plurality of devices capable of wireless communication in a radio service area of the network node, wherein the network node comprises a base station, and wherein the plurality of devices comprises a plurality of user equipment;
determining, by the network node, paging locations of a paging message in frames that at least one device of the plurality of devices shall periodically monitor in the radio service area, wherein the determining is based on one of group paging and dedicated paging used by the network node in the radio service area; and
sending, by the network node, to said at least one device a paging type indication indicative of a group paging or a dedicated paging that is used in the radio service area of the network node, to control, in a predetermined manner, calculation by said at least one device of paging locations in frames for the paging message to said at least one device to be according to one of a group paging mode if the paging type indication indicates group paging is used in the radio service area of the network node and a dedicated paging mode if the paging type indication indicates dedicated paging is used in a radio service area of the network node, wherein the paging type indication is sent prior to the paging message to the at least one device, and wherein the paging type indication causes said at least one device to monitor the calculated paging locations for the paging message.

4. A method according to claim 3, wherein the calculation in the dedicated paging mode comprises calculation of paging occasions in frames based on an identity of the device and the calculation in the group paging mode comprises calculation of paging occasions in frames based on an identity of at least one group of devices.

5. A method according to claim 3, wherein the paging type indication comprises a flag indicative of support for group paging used in the radio service area.

6. The method according to claim 5, wherein the flag comprises one of a one bit flag and a two bit flag, wherein a predetermined value of the one bit flag indicates group paging is used in the radio service area and causes calculation of paging occasions based on a device identity and at least one group identity and the other value of the one bit flag causes calculation of paging occasions based on the device identity and wherein a first predetermined value of the two bit flag causes calculation of paging occasions based on device identity; a second predetermined value of the two bit flag causes calculation of paging occasions based on at least one group identity, and a third predetermined value of the two bit flag causes calculation of paging occasions based on a device identity and at least one group identity.

7. A method according to claim 3, comprising communicating an indication of group paging from a mobility management entity to a station serving the plurality of stations, and in response thereto, switching the station in a group paging mode.

8. A method according to claim 3, comprising configuring a station serving the plurality of devices to a group paging mode by means of operations, administration and maintenance apparatus.

9. A method according to claim 3, wherein the group type indication comprises an identity of at least one group.

10. A method according to claim 9, comprising communicating information of the identity of the at least one group in a message of a first type and an indication of the mode of operation for the location in the frames calculations in a message of a second type.

11. A method according to claim 3, wherein at least a part of the paging type indication is included in one of system information or non access stratum signalling.

12. A computer program product comprising a non-transitory computer readable storage medium bearing computer program code executed by at least one processor to perform the method of claim 3 when the computer program code is run on a data processing apparatus.

13. An apparatus embodied in a user equipment comprising:
   at least one processor, and
   at least one memory including computer program code, wherein the at least one memory and the computer program code are configured, with the at least one processor, to cause the apparatus to at least:
   control paging in a communication system comprising a plurality of devices capable of wireless communication in a radio service area of the apparatus, wherein the plurality of devices comprises a plurality of user equipment;
   receiving, from the base station, a paging type indication that indicates that one of group paging or dedicated paging is used in the radio service area, wherein the paging type indication is received prior to receiving a paging message from the radio service area;
   determining if one of group paging or dedicated paging is to be used in the radio service area based on the paging type indication received at the apparatus;
   in response to the determination, calculating, in a predetermined manner, paging locations for the paging message in transmission frames according to one of a group paging mode if the paging type indicates group paging is to be used and a dedicated paging mode if the paging type indication indicates dedicated paging is to be used in the radio service area; and
   receiving in the radio service area the paging message in at least one of subsequent paging frames and paging occasions in the calculated paging locations as a result of periodic monitoring according to the one of the group paging or dedicated paging indicated in the received paging type indication.

14. An apparatus embodied in a base station comprising:
   at least one processor, and
   at least one memory including computer program code, wherein the at least one memory and the computer program code are configured, with the at least one processor, to cause the apparatus to at least:
   control paging in a communication system comprising a plurality of devices capable of wireless communication, wherein the plurality of devices comprises a plurality of user equipment;
   determining paging locations of a paging message in frames that at least one device of the plurality of devices shall periodically monitor in a radio service area; and
   sending to said at least one device a paging type indication indicative of one of group paging or dedicated paging that is used in the radio service area of the at least one device, to control, in a predetermined manner, calculation by said at least one device of paging occasions in frames for the paging message to the at least one device to be according to one of a group paging mode if the paging type indication indicates group paging is used in the radio service area of the at least one device and a dedicated paging mode if the paging type indication indicates dedicated paging is used in the radio service area of the at least one device, wherein the paging type indication is sent prior to the paging message to the at least one device, and wherein the paging type indication causes said at least one device to monitor the calculated paging occasions for the paging message.

15. The apparatus according to claim 14, wherein paging occasions in frames are calculated based on an identity of the device of the at least one device in the dedicated paging mode and paging occasions in frames are calculated based on an identity of at least one group of devices in the group paging mode.

16. The apparatus according to claim 14, wherein the paging type indication comprises a flag indicative of group paging being used in the radio service area.

17. The apparatus according to claim 16, wherein the flag comprises one of a one bit flag and a two bit flag, wherein a predetermined value of the one bit flag is indicative of the group paging and being used in the radio service area and calculation of paging occasions based on a device identity and at least one group identity, and the other value of the one bit flag is indicative of calculation of paging occasions based on the device identity; and
   wherein a first predetermined value of the two bit flag is indicative of calculation of paging occasions based on device identity;
   a second predetermined value of the two bit flag is indicative of calculation of paging occasions based on at least one group identity, and
   a third predetermined value of the two bit flag is indicative of calculation of paging occasions based on a device identity and at least one group identity.

18. The apparatus according to claim 14, wherein the at least one memory and the computer program code are further configured, with the at least one processor, to cause the apparatus to perform switching of a station serving the plurality of devices into the group paging mode in response to an indication of group paging from a network controller.

19. The apparatus according to claim 14, wherein the apparatus is configured to cause setting up of a station serving the plurality of devices into a group paging mode by means of an operations, administration and maintenance control apparatus associated with the station.

20. The apparatus according to any of claim 14, wherein the group type indication comprises an identity of at least one group.

21. The apparatus according to claim 20, wherein the apparatus is configured to communicate information of the identity of the at least one group in a message of a first type and an indication of the mode of operation for the paging location calculations in a message of a second type.

22. The apparatus according to claim 14, wherein at least a part of the paging type indication is included in one of system information and non access stratum signalling.

* * * * *

UNITED STATES PATENT AND TRADEMARK OFFICE
CERTIFICATE OF CORRECTION

PATENT NO. : 9,668,235 B2  
APPLICATION NO. : 13/985433  
DATED : May 30, 2017  
INVENTOR(S) : Zhang et al.

Page 1 of 2

It is certified that error appears in the above-identified patent and that said Letters Patent is hereby corrected as shown below:

In the Claims

Claim 1, Column 11, Line 35 "a" should be deleted in between --of-- and --group--.

Claim 1, Column 11, Line 39 "are" should be deleted and --area-- should be inserted.

Claim 3, Column 11, Line 64 "the" should be deleted and --a-- should be inserted.

Claim 3, Column 12, Line 9 "a" should be deleted and --one of-- should be inserted.

Claim 3, Column 12, Line 10 "a" should be deleted in between --or-- and --dedicated--.

Claim 3, Column 12, Line 19 "a" should be deleted and --the-- should be inserted.

Claim 4, Column 12, Line 26 "A" should be deleted and --The-- should be inserted.

Claim 5, Column 12, Line 32 "A" should be deleted and --The-- should be inserted.

Claim 5, Column 12, Line 33 "support for" should be deleted in between --of-- and --group--.

Claim 5, Column 12, Line 34 --being-- should be inserted in between --paging-- and --used--.

Claim 7, Column 12, Line 49 "A" should be deleted and --The-- should be inserted.

Claim 8, Column 12, Line 54 "A" should be deleted and --The-- should be inserted.

Claim 9, Column 12, Line 58 "A" should be deleted and --The-- should be inserted.

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 9,668,235 B2

Claim 10, Column 12, Line 60 "A" should be deleted and --The-- should be inserted.

Claim 11, Column 12, Line 65 "A" should be deleted and --The-- should be inserted.

Claim 11, Column 12, Line 68 "or" should be deleted and --and-- should be inserted.

Claim 12, Column 13, Line 2 "bearing" should be deleted and --embodying-- should be inserted.

Claim 13, Column 13, Line 18 "the" should be deleted and --a-- should be inserted.

Claim 13, Column 13, Line 29 --indication-- should be inserted in between --type-- and --indicates--.

Claim 13, Column 13, Line 36 "the" should be deleted after --of--.

Claim 15, Column 14, Line 11 "the" should be deleted and --a-- should be inserted.

Claim 17, Column 14, Line 22 "and" should be deleted after --paging--.